(12) United States Patent
Yang

(10) Patent No.: US 7,788,427 B1
(45) Date of Patent: Aug. 31, 2010

(54) FLASH MEMORY INTERFACE FOR DISK DRIVE

(75) Inventor: Yun Yang, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 614 days.

(21) Appl. No.: 11/322,447

(22) Filed: Dec. 29, 2005

Related U.S. Application Data

(60) Provisional application No. 60/678,249, filed on May 5, 2005, provisional application No. 60/748,421, filed on Dec. 7, 2005.

(51) Int. Cl.
G06F 13/00 (2006.01)
G06F 13/12 (2006.01)
G06F 13/38 (2006.01)

(52) U.S. Cl. .......................................... 710/62; 710/29
(58) Field of Classification Search ............... 710/62, 710/29
See application file for complete search history.

(56) References Cited

U.S. PATENT DOCUMENTS

| | | | |
|---|---|---|---|
| 4,425,615 A | 1/1984 | Swenson et al. | |
| 5,150,465 A * | 9/1992 | Bush et al. | 710/14 |
| 5,293,500 A | 3/1994 | Ishida et al. | |
| 5,455,913 A * | 10/1995 | Shrock et al. | 710/100 |
| 5,485,595 A | 1/1996 | Assar et al. | |
| 5,596,708 A | 1/1997 | Weber | |
| 5,659,718 A | 8/1997 | Osman et al. | |
| 5,768,164 A | 6/1998 | Hollon, Jr. | |
| 5,809,336 A | 9/1998 | Moore et al. | |
| 5,937,423 A | 8/1999 | Robinson | |
| 6,006,320 A | 12/1999 | Parady | |
| 6,035,408 A | 3/2000 | Huang et al. | |
| 6,122,720 A | 9/2000 | Cliff | |
| 6,282,614 B1 | 8/2001 | Musoll | |
| 6,457,135 B1 | 9/2002 | Cooper | |
| 6,496,915 B1 | 12/2002 | Halleck | |
| 6,501,999 B1 | 12/2002 | Cai | |
| 6,578,129 B1 | 6/2003 | da Silva, Jr. et al. | |
| 6,594,724 B1 | 7/2003 | Smith | |
| 6,598,148 B1 | 7/2003 | Moore et al. | |
| 6,628,469 B1 | 9/2003 | Hoyt | |
| 6,631,469 B1 | 10/2003 | Silvester | |

(Continued)

FOREIGN PATENT DOCUMENTS

CN      1 550 951      12/2004

(Continued)

OTHER PUBLICATIONS

Atsushi Inoue and Doug Wong, "NAND Flash Applications Design Guide", Apr. 2003, Revision 1.0, p. 15.*

(Continued)

*Primary Examiner*—Chun-Kuan Lee

(57) ABSTRACT

Method and circuit for coupling a disk drive to a host are disclosed. The circuit includes a flash memory interface having interface signal lines in communication with the interface controller and the host, a buffer memory to store data received from the host and from the disk drive, a flash controller to emulate data transfer protocols of the disk drive using the interface signal lines over the flash memory interface, and a memory wrapper in communication with the interface controller and a buffer manager where the memory wrapper controls the buffering memory according to data transfer rates of the host and the disk drive.

31 Claims, 12 Drawing Sheets

U.S. PATENT DOCUMENTS

| | | | |
|---|---|---|---|
| 6,631,474 | B1 | 10/2003 | Cai |
| 6,639,827 | B2 | 10/2003 | Clark et al. |
| 6,725,336 | B2 | 4/2004 | Cherabuddi |
| 6,763,480 | B2 | 7/2004 | Harari et al. |
| 6,775,180 | B2 | 8/2004 | Biyani et al. |
| 6,859,856 | B2 | 2/2005 | Piau et al. |
| 6,901,503 | B2 | 5/2005 | Barlow |
| 6,925,529 | B2 | 8/2005 | Bohrer et al. |
| 6,976,180 | B2 | 12/2005 | Cupps et al. |
| 6,985,778 | B2 | 1/2006 | Kim et al. |
| 6,986,066 | B2 | 1/2006 | Morrow et al. |
| 7,069,388 | B1 | 6/2006 | Greenfield et al. |
| 7,082,495 | B2 | 7/2006 | DeWhitt et al. |
| 7,184,003 | B2 | 2/2007 | Cupps et al. |
| 7,216,242 | B2 | 5/2007 | Cupps et al. |
| 7,221,331 | B2 | 5/2007 | Bear et al. |
| 7,231,531 | B2 | 6/2007 | Cupps et al |
| 7,234,049 | B2 * | 6/2007 | Choi et al. ............... 713/1 |
| 7,240,228 | B2 | 7/2007 | Bear et al. |
| 7,254,730 | B2 | 8/2007 | Kardach et al. |
| 7,269,752 | B2 | 9/2007 | John |
| 7,492,368 | B1 | 2/2009 | Nordquist et al. |
| 7,500,127 | B2 | 3/2009 | Fleck et al. |
| 2002/0083264 | A1 | 6/2002 | Coulson |
| 2002/0124196 | A1 | 9/2002 | Morrow et al. |
| 2002/0129288 | A1 | 9/2002 | Loh et al. |
| 2003/0100963 | A1 | 5/2003 | Potts et al. |
| 2003/0110012 | A1 | 6/2003 | Orenstien et al. |
| 2003/0135771 | A1 | 7/2003 | Cupps et al. |
| 2003/0153354 | A1 | 8/2003 | Cupps et al. |
| 2003/0163666 | A1 | 8/2003 | Cupps et al. |
| 2003/0226044 | A1 | 12/2003 | Cupps et al. |
| 2004/0003168 | A1 | 1/2004 | Kim et al. |
| 2004/0064647 | A1 | 4/2004 | DeWhitt et al. |
| 2004/0163004 | A1 | 8/2004 | Kardach et al. |
| 2004/0225901 | A1 | 11/2004 | Bear et al. |
| 2004/0243761 | A1 | 12/2004 | Bohrer et al. |
| 2005/0064911 | A1 | 3/2005 | Chen et al. |
| 2005/0066209 | A1 | 3/2005 | Kee et al. |
| 2005/0131584 | A1 | 6/2005 | Law et al. |
| 2005/0172074 | A1 | 8/2005 | Sinclair |
| 2005/0182980 | A1 | 8/2005 | Sutardja |
| 2005/0278559 | A1 | 12/2005 | Sutardja et al. |
| 2005/0289361 | A1 | 12/2005 | Sutardja et al. |
| 2006/0007051 | A1 | 1/2006 | Bear et al. |
| 2006/0031610 | A1 * | 2/2006 | Liav et al. ............... 710/66 |
| 2006/0069848 | A1 * | 3/2006 | Nalawadi et al. ........... 711/103 |
| 2006/0075145 | A1 | 4/2006 | Azzarito et al. |
| 2006/0095807 | A1 | 5/2006 | Grochowski et al. |
| 2006/0129861 | A1 | 6/2006 | Kee et al. |
| 2006/0136656 | A1 * | 6/2006 | Conley et al. ............... 711/103 |
| 2006/0218324 | A1 * | 9/2006 | Zayas ............... 710/65 |
| 2006/0277360 | A1 | 12/2006 | Sutardja |
| 2007/0028292 | A1 | 2/2007 | Kabzinski et al. |
| 2007/0055841 | A1 | 3/2007 | Jansen et al. |

FOREIGN PATENT DOCUMENTS

| | | |
|---|---|---|
| EP | 0 666 539 A | 8/1995 |
| EP | 0 702 305 A | 3/1996 |
| EP | 1 605 453 A2 | 12/2005 |
| EP | 1 605 456 A2 | 12/2005 |
| WO | WO 01/15161 | 3/2001 |
| WO | WO 2004/090889 | 10/2004 |

OTHER PUBLICATIONS

Cast, Inc. (Date Unknown). NFlashCntl NAND Flash Memory Controller Core Product Description, located at <http://www.cast-inc.com/cores/nflashcntl/index.shtml>, last visited on Jul. 29, 2005, three pages.

Cast, Inc. (2004). NFlashCtrl: NAND Flash Memory Controller Megafunction Product Description, two pages.

Cirrus Logic, Inc. (Sep. 1998). CL-SH7660 Advanced Architecture ATA Disk Controller Preliminary Product Bulletin, four pages.

Electronics Press World. (Jul. 7, 2003). "Power Digital Card (PDC) and Samsung Strikes Again As an Industry First to Release the 128MegaByte Reduced Size MultiMediaCards," located at <http://electronics.press-world.com/v/48895/power-digital-card-pdc-and-samsung-strikes-again-as-an-idust...>, last visited on Mar. 7, 2006, three pages.

GD Technik. (Date Unknown). "Flash Memory Module Thinks it's a Hard Disk: New from GD Technik is the DIMMDrive, a High-Performance Flash Memory Module Made by White Electronic Design," Press Release from GD Technik, located at <http://www.electronicstalk.com/news/gdt/gdt117.html>, last visited on Mar. 7, 2006, two pages.

Hachman, M. (Apr. 25, 2005) "Samsung: 'Hybrid' Hard Drives Will Ship in 2006," located at <http://www.extremetech.com/article2/0,1558,1789189,00.asp>, last visited on Jul. 29, 2005, two pages.

MemoryClub.co.uk (Date Unknown). Kingmax HS-MMC Product Description, located at <http://www.websetters.co.uk/MemoryClub/HSMMC.html>, last visited on Jul. 28, 2005, one page.

Mittoni (Date Unknown). CompactFlash Controller Product Description, located at <http://www.mittoni.com/compactflash/article5.html>, last visited on Jul. 28, 2005, two pages.

Mittoni (Date Unknown). CompactFlash Memory Cards Information, located at <http://www.mittoni.com/compactflash/compactflash.html>, last visited on Jul. 28, 2005, two pages.

Optics Planet, Inc. (Date Unknown). Silicon Power SD/MMC Card Reader Product Description, located at <http://www.opticsplanet.net/silicon-power-sd-mmc-card-reader-html>, last visited on Mar. 7, 2006, two pages.

Pretec Electronics Corp. (2005). Mini IDE (MIDE) Flash Drive Product Description, located at <http://www.pretec.com/product/SSD/Industrial/miniide.html>, last visited Jul. 28, 2005, four pages.

Silicon Storage Technology, Inc. (2002). ATA Flash Disk Controller: SST55LD017A/SST55LD017B/SST55LD017C Preliminary Specifications, 52 pages.

Wikipedia (Date Unknown). "Flash Memory," located at <http://en.wikipedia.org/wiki/Flash_memory>, last visited on Jul. 28, 2005, three pages.

U.S. Appl. No. 11/322,447, filed Dec. 29, 2005, Yang, Yun.

U.S. Appl. No. 60/678,249, filed May 5, 2005, Yang, Yun.

HDD Photo Storage—Operating Instructions for HDPS-MI Sony, [Online] Jun. 17, 2004, XP002481634 URL:http://www.manualshark.org/manualshark/files/4/pdf6738.pdf—10 pages.

ANSI/IEEE Std. 802.11, 1999 Edition; Part 11: Wireless LAN Medium Access Control (MAC) and Physical Layer (PHY) specifications; Information technology—Telecommunications and information exchange between systems—Local and metropolitan area networks—Specific requirements; pp. 1-512.

IEEE P802.11g/D8.2 Apr. 2003 (Supplement to ANSI/IEEE std. 802.11 1999 (Reaff 2003)) Draft Supplement Standard for Part 11: Wireless LAN Medium Access Control (MAC) and Physical Layer (PHY) Specifications Information technology—Telecommunications and information exchange between systems—Local and metropolitan area networks—Specific requirements; Further Higher Data Rate Extension in the 2.4 GHz Band; pp. 1-69.

IEEE Std. 802.11a-1999; Supplement to IEEE Standard for Information Technology—Telecommunications and information exchange between systems—Local and metropolitan area networks—Specific requirements; Part: 11 Wireless LAN Medium Access Control (MAC) and Physical Layer (PHY) specifications; High-speed Physical Layer in the 5 GHz Band; pp. 1-83.

IEEE Std. 802.11b; Supplement to IEEE Standard for Information technology—Telecommunications and information exchange between systems—Local and metropolitan area networks—Specific requirements; Part 11: Wireless LAN Medium Access Control (MAC) and Physical Layer (PHY) specifications: Higher-Speed Physical Layer Extension in the 2.4 GHz Band; Approved Sep. 16, 1999; pp. 1-89.

IEEE Std. 802.11b-1999/Cor Jan. 2001; IEEE Standard for Information technology—Telecommunications and information exchange between systems—Local and metropolitan area networks—specific requirements; Part 11: Wireless LAN Medium Access Control (MAC) and Physical Layer (PHY) Specifications; Amendment 2: Higher-speed Physical Layer (PHY) extension in the 2.4 GHz band—Corrigendum 1; pp. 1-15.

IEEE Std. 802.16; IEEE Standard for Local and metropolitan area networks; Part 16: Air Interface for Fixed Broadband Wireless Access Systems; Apr. 8, 2002; pp. 1-322.

IEEE Std. 802.16a; IEEE Standard for Local and metropolitan area networks; Part 16: Air Interface for Fixed Broadband Wireless Access Systems—Amendment 2: Medium Access Control Modifications and Additional Physical Layer Specifications for 2-11 GHz; Apr. 1, 2003; pp. 1-292.

Cast, Inc. (Jun. 2004) "NFlashCtrl NAND Flash Memory Controller Megafunction"; 2 pages.

Cast, Inc. "NFlashCtrl NAND Flash Memory Controller Core"; http://www.cast-inc.com/cores/nflashcnt/index.shtml—Jul. 29, 2005; 3 pages.

Cirrus Logic; CL-SH7660 Preliminary Product Bulletin; "Advanced Architecture ATA Disk Controller"; Sep. 1998: 4 pages.

Electronics Press World, "Power Digital Card (PDC) and Samsung Strikes Again As an Industry First to Release the 128MegaByte Reduced Size MultiMediaCards," http://electronics.press-world.com/v/48895/power-digital-card-pdc-and-samsung-strikes-again-as-an-indus...; Jul. 7, 2003, 3 pages.

Press Release from GD Technik; Flash Memory Module thinks it's a Hard Disk; http://www.electronicstalk.com/news/gdt/gdt17.html; Apr. 25, 2005; 2 pages.

Hachman, M., "Samsung: 'Hybrid' Hard Drives Will Ship in 2006," http://www.extremetech.com/article/2/0, 1558, 1789189,00.asp, Apr. 25, 2005: 2 pages.

Pretec Electronics Corp.; Mini IDE (MIDE) Flash Drive; http://www.pretec.com/product/SSD/Industrial/miniide.htm; 2005; 4 pages.

2002 Silicon Storage Technology, Inc.; "ATA Flash Disk Controller" SST55LDo17A/SST55LD017B/SST55LD017C; Preliminary Specifications; 2002; 52 pages.

U.S. Appl. No. 60/799,151, Sutardja et al.

U.S. Appl. No. 60/820,867, Sutardja et al.

Dean Takahashi; "PortalPlayer Takes a Leap", The Mercury News, Mar. 14, 2006, 3 pages.

U.S. Appl. No. 60/822,015, Sutardja et al.

U.S. Appl. No. 60/823,453, Sutardja et al.

U.S. Appl. No. 60/825,368, Sutardja et al.

U.S. Appl. No. 60/890,684, Sutardja et al.

Seng et al. "Reducing power with dynamic critical path information," Proceedings of the 34th annual ACM/IEEE International symposium on Microarchitecture, ACM, 2001. pp. 114-123.

Wikipedia; "CompactFlash"; http://web.archive.org/web/20060109003035/http://en.wikipedia.org/wiki/CompactFlash_II; Jan. 9, 2006; 4 pages.

* cited by examiner

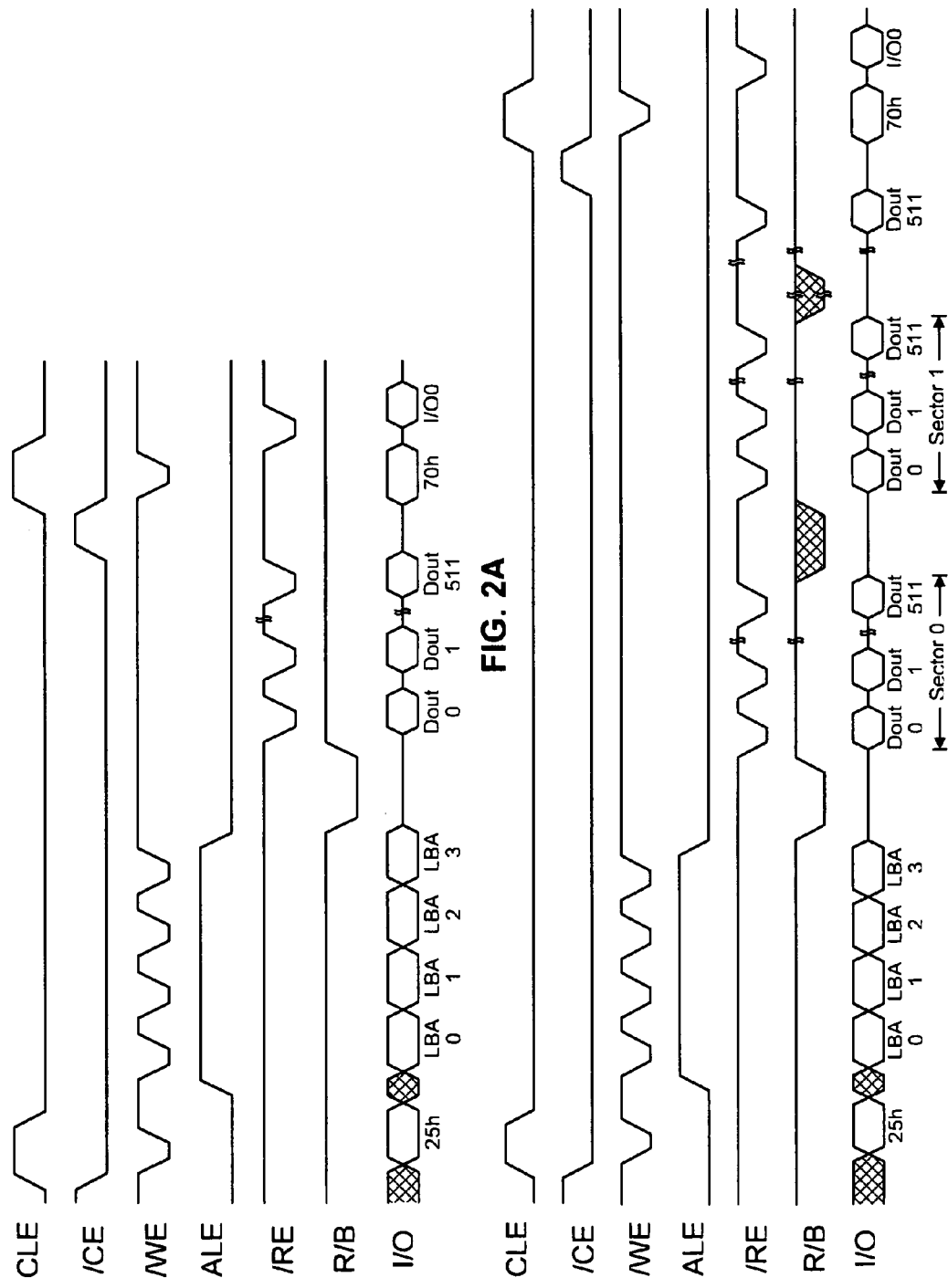

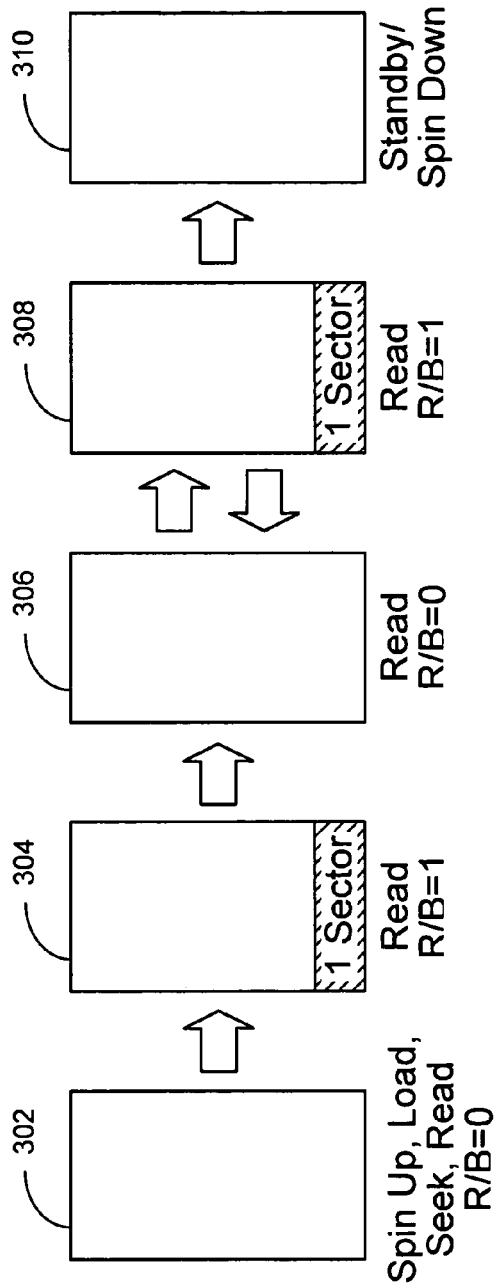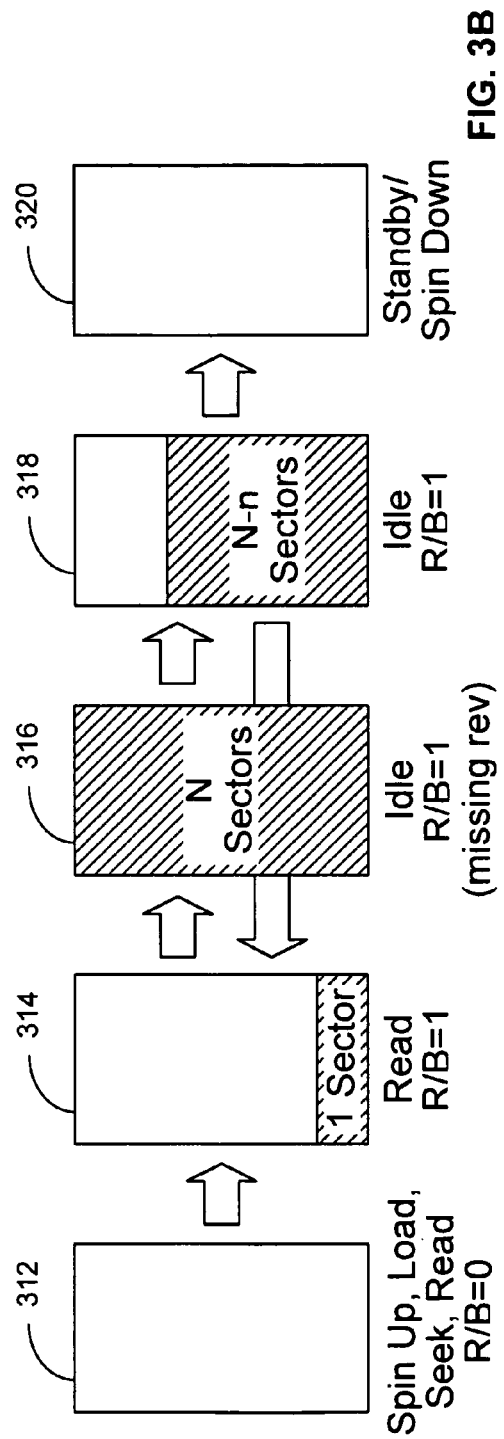

| Command | 1st Cycle | 2nd Cycle | Protocol |
|---|---|---|---|
| READ DMA EXT | 25h | 70h | Random Read, Sequential Read |
| WRITE DMA EXT | 35h | 70h | Random Write, Sequential Write |
| STANDBY IMMEDIATE | E0h | 70h | Non-Data |
| FLUSH CACHE EXT | EAh | 70h | Non-Data |
| Reset | FFh | | |

FIG. 4A

| Terminal Name | Terminal Description |
|---|---|
| I/O[0:7] | Data Input/Output |
| CLE | Command Latch Enable |
| ALE | Address Latch Enable |
| /CE | Chip Enable |
| /RE | Read Enable |
| /WE | Write Enable |
| R/B | Ready/Busy |

FIG. 4B

FLASH MEMORY INTERFACE FOR DISK DRIVE

CROSS-REFERENCE TO RELATED APPLICATIONS

This application claims the benefit of the following applications: application No. 60/678,249, entitled "nDrive HDD Interface," filed May 5, 2005; and application No. 60/748,421 entitled "Flash Memory/Disk Drive Interface and Method for Same," filed Dec. 7, 2005; which are incorporated herein in their entirety by reference.

FIELD OF THE INVENTION

This disclosure relates to a method and apparatus for connecting different types of data storage interfaces. In particular, the disclosure relates to emulating data transfer protocols of a disk drive over a flash memory interface.

BACKGROUND

Flash memory is a non-volatile memory that enables data programming and deleting in a system after the system is deployed in the field. Due to the compact size of flash memory, it is commonly used in many consumer devices, such as digital camera, cellular phone, personal digital assistant (PDA), MP3 player, audio recorder, laptop computer, television set-top box, etc. Many such consumer devices are designed to accept flash memory devices and so have a specific flash memory interface, such as a flash memory connector or slot, in which flash memory devices may be inserted. This interface controls the data flow between the host device and the flash memory.

However, the amount of data that can be stored through the flash memory interface is limited to the capacity of the flash memory device. A currently available flash memory may be able to store up to about one gigabyte (1 GB) of data, which is significantly lower than a currently available disk drive that may be able to store a few hundred gigabytes of data. Therefore, there is a need for an apparatus and method to couple a disk drive to a host device having a flash memory interface.

SUMMARY

In accordance with this disclosure, an interface controller is provided that allows connection of such a disk drive to a host slot or interface that is intended to accept flash memory. In one embodiment, an interface controller for coupling a disk drive to a host includes a flash memory interface having interface signal lines in communication with the interface controller and the host, a buffer memory to store data received from the host and from the disk drive, a flash controller to emulate data transfer protocols of the disk drive using the interface signal lines over the flash memory interface, and a memory wrapper in communication with the interface controller and a buffer manager where the memory wrapper controls the buffering memory according to data transfer rates of the host and the disk drive.

Conversions between the disk drive data and command formats and the host flash memory interface data and commands are performed by the interface. Thereby the disk drive appears to the host to be a flash memory and can be addressed and accessed as if it were a flash memory. The host system is typically of the type described above, such as digital cameras, portable music systems such as MP3 players, personal digital assistance, cellular telephones, laptop computers, personal digital assistance, etc. Hence the disclosed interface controller allows transmission of data stored to/from the disk drive via one or more standard industry input/output interfaces to the host system which typically includes a flash memory type interface.

The disclosed interface controller may be compatible on the host side with one or more of a variety of industry standard flash memory interfaces such as SD/MMC, SD, MMC, HS-MMC, SD/HS-MMC, and Memory Stick, but this is not limiting. On the disk drive side, the controller or interface may be compatible with one or more industry standard disk drive interfaces such as ATA, CE-ATA, and IDE and others as desired. The disclosed interface controller supports data transfers to and from the disk drive, whether the host is operating at a faster or slower data transfer rate than the disk drive. Therefore typically a buffer (storage) is included in or associated with the disclosed interface controller. The disclosed interface controller supports both random (single logical block) read or write operations as well as sequential (multiple logical block) read or write operations. Moreover, the sequential read or write operation may be open-ended in terms of the number of logical blocks transferred. Control features are provided in the disclosed interface controller for the disk drive such as servo control, disk formatting, error correction and read channel processing as part of a disk drive controller. The buffer referred to above may be on a separate integrated circuit or may be incorporated on the same integrated circuit as the interface. There also may be provided a connection from the disclosed interface controller to a separate flash memory for additional storage.

Also contemplated is a method of coupling a host to a disk drive (such as a hard disk drive or optical disk drive) via a flash memory interface so that the disk drive, in combination with the interface, appears to the host as being a flash memory. In one embodiment, a method for coupling a disk drive to a host includes coupling interface signals from an interface controller to the host via a flash memory interface and coupling the interface controller to a buffer memory for storing data received from the host and from the disk drive. The method further includes emulating data transfer protocols of the disk drive using the interface signals over the flash memory interface, and controlling the buffering memory according to data transfer rates of the host and the disk drive.

Also contemplated is a system including the host, a disk drive such as an optical or magnetic (hard) disk drive, and means for connecting the two, where the means for connecting couples to a flash memory interface provided by the host. In one embodiment, a system for coupling a disk drive to a host includes means for interfacing to the host via a flash memory interface, means for storing data received from the host and from the disk drive, means for emulating data transfer protocols of the disk drive using the interface signals over the flash memory interface, and means for controlling the buffering memory according to data transfer rates of the host and the disk drive.

Hence, the means for coupling a disk drive to a host includes an interface controller which presents to the host as being a flash memory. The interface controller includes logic for emulating data transfer protocols of the disk drive using the interface signals over the flash memory interface and storing data and/or commands so as to present same in a form suitable for standard disk drive interfaces to the disk drive.

Also contemplated are systems, including the host, the disclosed interface controller, and the disk drive, all incorporated in a single electronic device such as digital camera, cellular phone, personal digital assistant (PDA), MP3 player, audio recorder, laptop computer, television set-top box, etc.

The interface controller in certain embodiments may be implemented as an integrated circuit separated from the host and from the disk drive circuitry. In other embodiments, it may be combined with either the host or the disk drive circuitry. Yet in other embodiments, the disclosed interface controller may be implemented as a separate integrated circuit which is on a card adapted to connect to a standard flash memory interface slot on the host system.

BRIEF DESCRIPTION OF THE DRAWINGS

The aforementioned features and advantages of the invention as well as additional features and advantages thereof will be more clearly understandable after reading detailed descriptions of embodiments of the invention in conjunction with the following drawings.

FIGS. 2A, 2B, 2C, 2D and 2E show timing waveforms for various commands of the interface controller of FIG. 1A.

FIGS. 3A and 3B illustrate graphically the buffering of the interface controller of FIG. 1A for a read operation.

FIG. 4A shows a list of commands a host uses for communication to the disclosed interface controller according to an embodiment of the present invention.

FIG. 4B shows exemplary interface signals and corresponding terminal assignments between the present controller and the host so that the present controller appears to the host to be a NAND flash memory.

DETAILED DESCRIPTION

The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description which follows are presented in terms of procedures, steps, logic blocks, processing, and other symbolic representations of operations on data bits that can be performed on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1A:
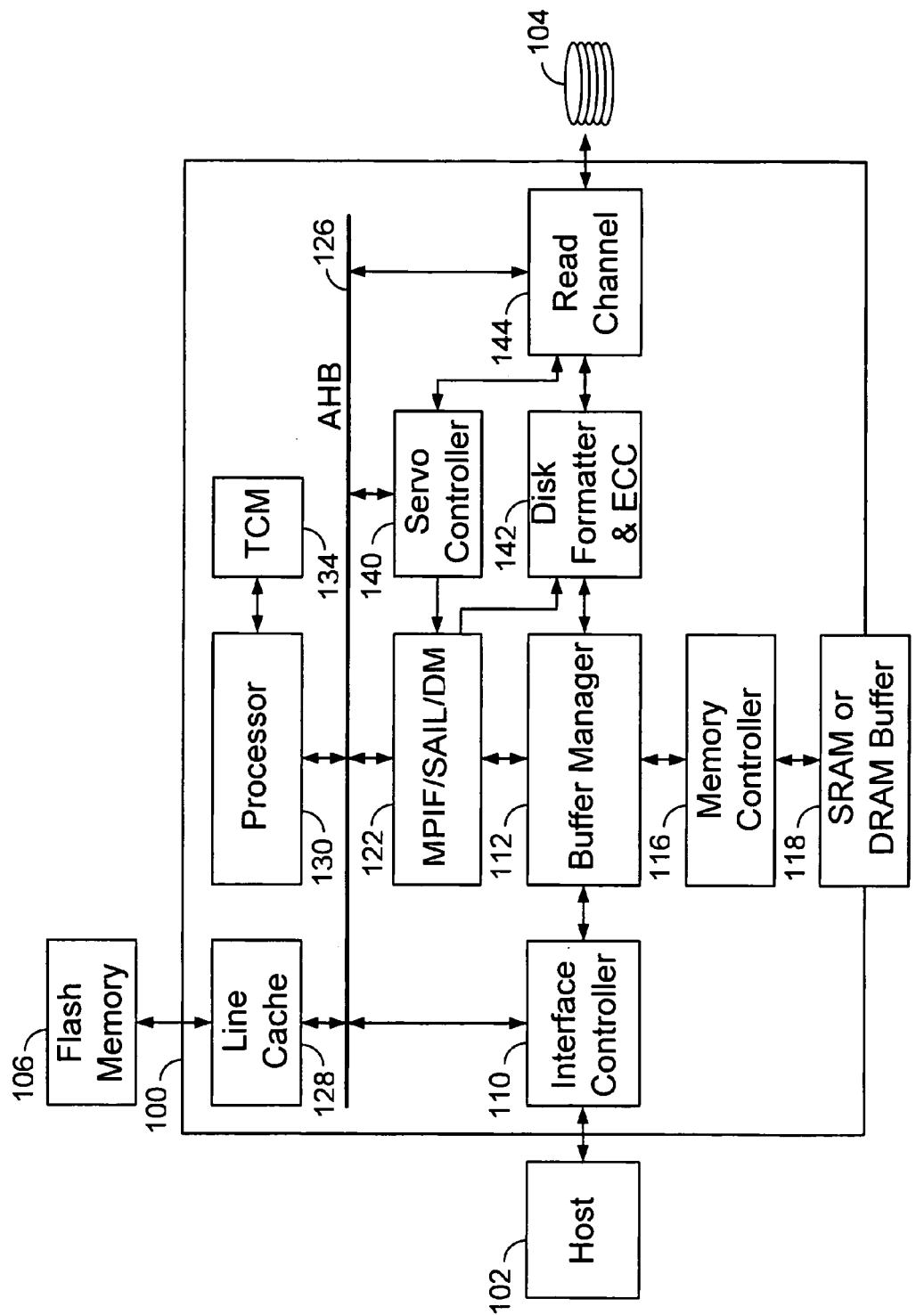
FIG. 1A is a block diagram of a disk drive controller incorporating a flash memory and disk drive interface controller according to an embodiment of the present invention.

FIG. 1A is a block diagram of a disk drive controller incorporating a flash memory and disk drive interface controller according to an embodiment of the present invention. As shown in FIG. 1A, the disk drive controller 100 couples between a host 102 and a disk drive 104. The disk drive 104 typically has an advanced technology attachment (ATA), consumer electronics ATA (CE-ATA), or integrated drive electronics (IDE) type interface. Also coupled to the disk drive controller 100 is an auxiliary flash memory 106, which stores firmware code for the disk drive controller. In this case, the host 102, while shown as a single block, typically includes as relevant components an industry standard flash memory slot (connector) of the type for connecting to commercially available flash memory devices, which in turn is connected to a standard flash memory controller in the host. This slot typically conforms to one of the standard types, for instance, MMC (Multi Media Card), SD (Secure Data), SDIMMC which is a combination of SD and MMC, HS-MMC (High Speed-MMC), SD/HS-MMC which is a combination of SD and HS-MMC, and Memory Stick. This list is not limiting. Throughout the disclosure, the abbreviations MP3, SRAM, DRAM, and WLAN denote MPEG-1 Audio Layer 3, static random access memory, dynamic random access memory, and wireless local area network respectively.

A typical application is a portable computer or consumer electronic device such as MP3 music player or cellular telephone handset that has one application processor that connects to an embedded flash memory through a NAND flash memory interface. In accordance with this disclosure, rather than a flash memory, a hard disk drive or other type of disk drive is provided replacing the flash memory and using its interface signals. The disclosed method provides a flash memory-like interface for a disk drive, which makes it easier to incorporate a disk drive in such a host system which normally only accepts flash memory. One advantage of a disk drive over flash memory as a storage device is far greater storage capacity for a particular cost.

In FIG. 1A, the primary data storage is provided by the disk drive 104. Advantageously, only minimum changes in the host 102 flash memory controller firmware and software need be made to incorporate the disk drive using the disclosed interface controller. Also, minimum command overhead is provided. Advantageously, there is open-ended data transfer for any particular read or write operation, in terms of the number of logic blocks transferred between the host and the disk drive. Also, no sector count of the disk drive need be provided by the host.

In certain embodiments the disk drive 104 may be referred to by an industry as a small form factor (SFF) hard disk drive, which typically has a physical size of 650×15×70 mm. A typical data transfer rate of such SSF hard disk drive is 25 megabytes per second.

The functions of the disk drive controller 100 of FIG. 1A are further explained below. The disk drive controller 100 includes an interface controller 110, which presents to the host system 102 as a flash memory controller with a 14-line bus having the signal designations shown in FIG. 4B and discussed below. The interface controller 110 also performs the functions of host command interpretation and data flow control between the host 102 and a buffer manager 112. The buffer manager circuit 112 controls, via a memory controller 116, the actual buffer (memory), which may be an SRAM or DRAM buffer 118 that may be included as part of the same chip as interface controller 100 or be on a separate chip. The buffer manager provides buffering features that are described further below.

The buffer manager 112 is also connected to a processor Interface/Servo and ID-Less/Defect Manager (MPIF/SAIL/DM) circuit 122, which performs the functions of track format generation and defect management. The MPIF/SAIL/DM circuit 122 in turn connects to the Advanced High Performance Bus (AHB) 126. Connected to the AHB bus 126 is a line cache 128, and a processor 130; a Tightly Coupled Memory (TCM) 134 is associated with the processor 130. The processor 130 may be implemented by an embedded processor or by an external microprocessor. The purpose of the line cache 128 is to reduce code execution latency. It may be coupled to an external flash memory 106.

The remaining blocks in the disk drive controller 100 perform functions to support a disk drive and include the servo controller 140, the disk formatter and error correction circuit 142, and the read channel circuitry 144, which connects to the pre-amplification circuit in the disk drive 104.

The signals used between the host 102 and the interface controller 110 are shown in FIG. 4B. This contemplates a 14-line parallel bus with 8 lines (0-7) carrying the bi-directional in/out (I/O) data. The remaining lines carry the commands CLE, ALE, /CE, /RE, /WE and R/B respectively.

Figure 1B:
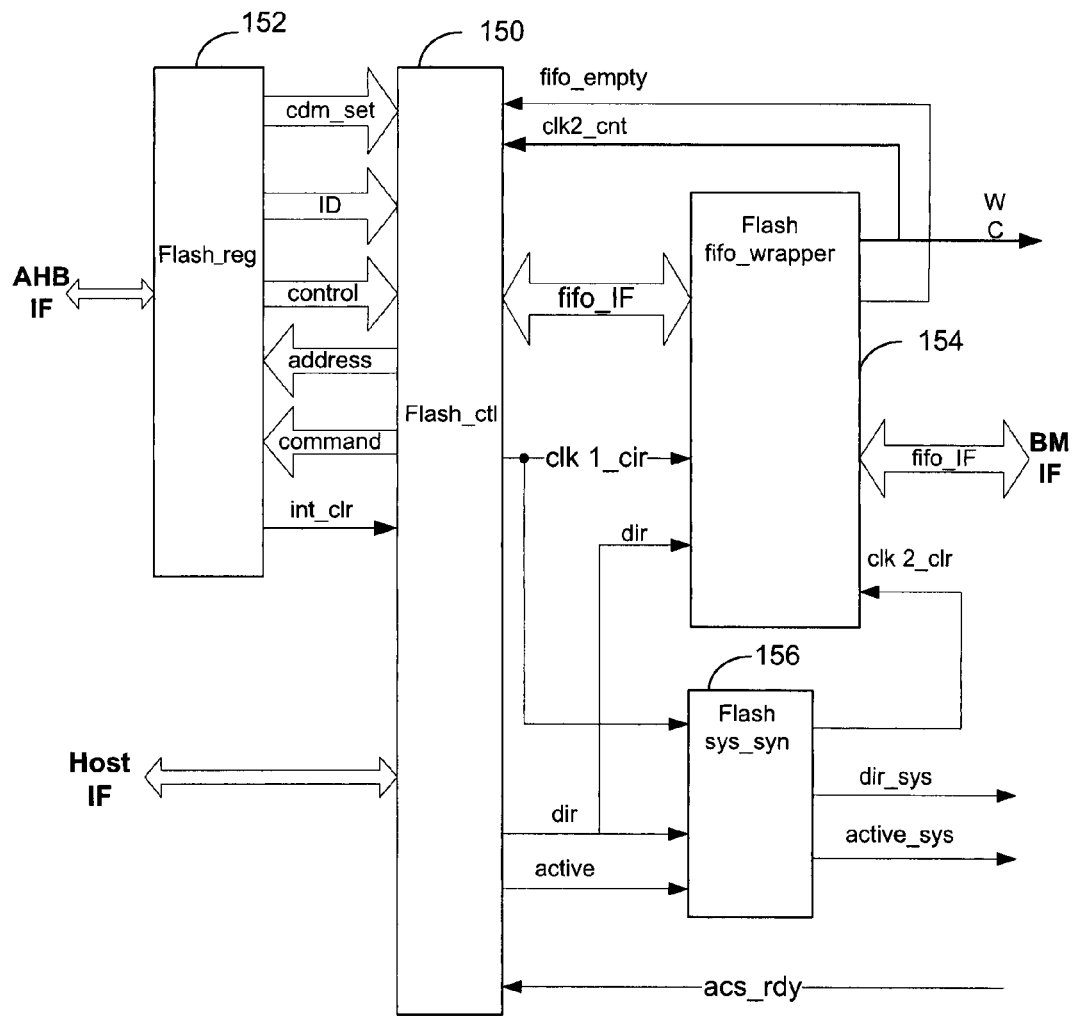
FIG. 1B shows a block diagram of the interface controller of FIG. 1A according to an embodiment of the present invention.

FIG. 1B shows a block diagram of the interface controller of FIG. 1A according to an embodiment of the present invention. The interface controller 110 includes a flash controller (Flash_ctl) block 150, a flash register (Flash_reg) block 152, a flash FIFO wrapper (Flash_fifo_wrapper) block 154, and a flash system synchronization (Flash_sys_syn) block 156.

The flash register block 152 is used for register access. It stores commands programmed by the processor 130 and the host 102. A flash state machine (not shown) in the flash controller 150 decodes the incoming command from the host 102 and provides the controls for the disk drive controller 100. The flash FIFO wrapper 154 includes a FIFO, which may be implemented by a 32×32 bi-directional asynchronous FIFO. It generates data and control signals for transferring data to and receiving data from the buffer manager 112 via the buffer manager interface (BM IF). The transfer direction of the FIFO may be controlled by the commands stored in the flash register 152. The flash system synchronization block 156 synchronizes control signals between the interface controller and the buffer manager interface. It also generates a counter clear pulse (clk2_clr) for the flash FIFO wrapper 154.

Figure 2C:
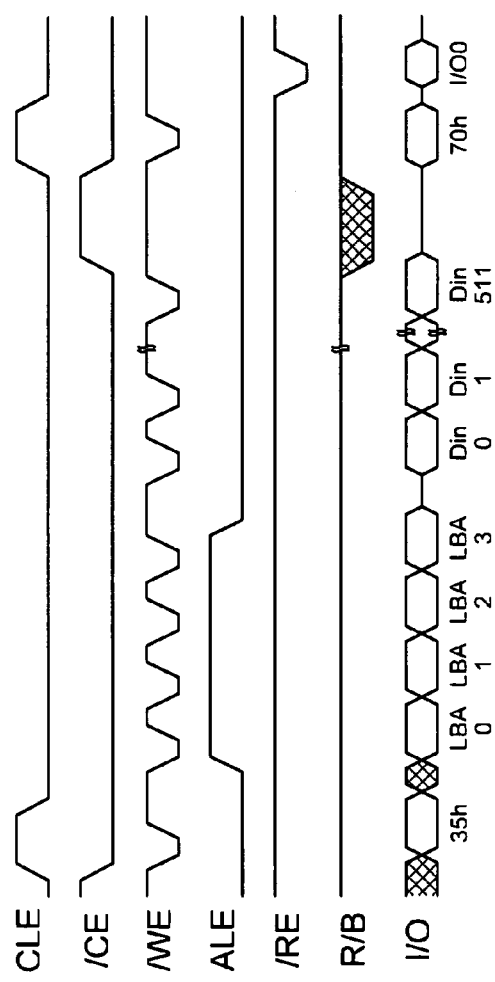

FIGS. 2A-2E show timing waveforms for the signals on signal lines of the interface controller of FIG. 1A according to embodiments of the present invention. FIG. 2A shows the timing waveforms for a random read process whereby a single logical block is read from the disk drive to the host. Note that these timing waveforms embody relatively minor modifications from those timing waveforms of the same commands as used with a standard NAND flash memory controller. The signals themselves are the standard NAND flash memory signals but the timing is somewhat modified here to accommodate the disk drive which is of course the source/sink of the data rather than a NAND flash memory. Note that in the ATA specification, typically one logical block is one sector of disk drive data. Hence, the random read of FIG. 2A typically represents one logical block of data to be read from the disk drive.

FIG. 2B in contrast shows timing waveforms for a sequential read where a number of logical blocks are read from the disk drive in one operation. In the case of the sequential read, the reading continues until reading is disabled by de-assertion of the RE command. As shown in the I/O waveform of FIG. 2B, there are two sectors of data being transferred, sector 0 and sector 1. Note that such sequential reads are typically not provided in the usual NAND flash memory interface since NAND flash memory typically cannot support sequential reads or writes. Also shown in the I/O waveform of FIG. 2B is the return of the status by the device indicated by one byte of data following command 70h.

Figure 2D:
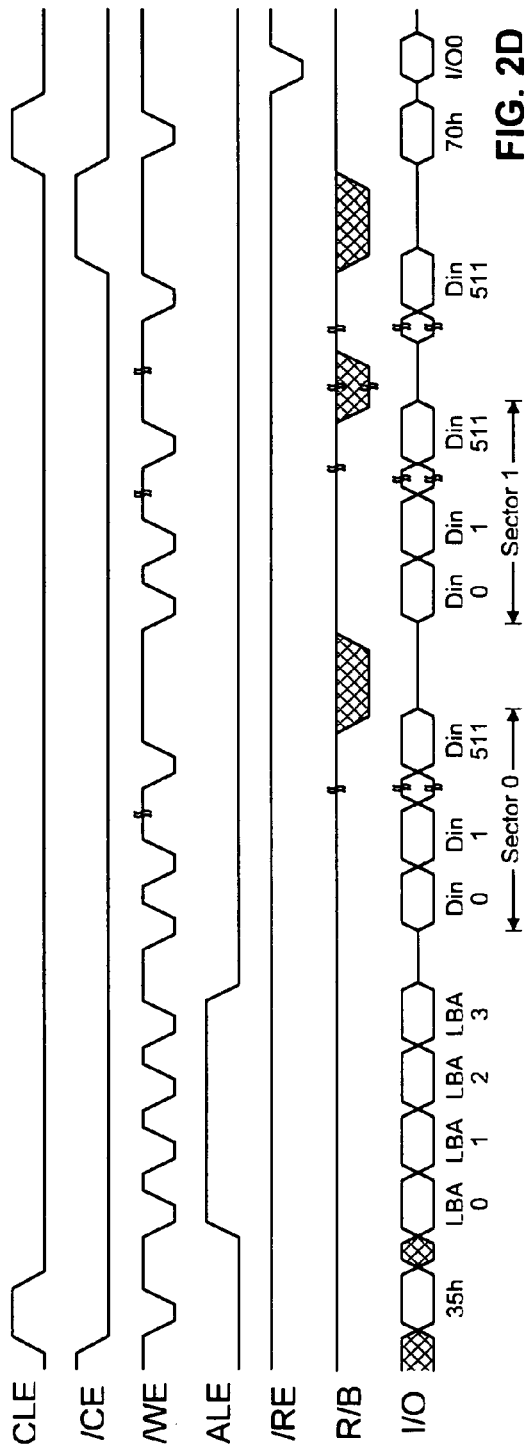
Figure 2E:
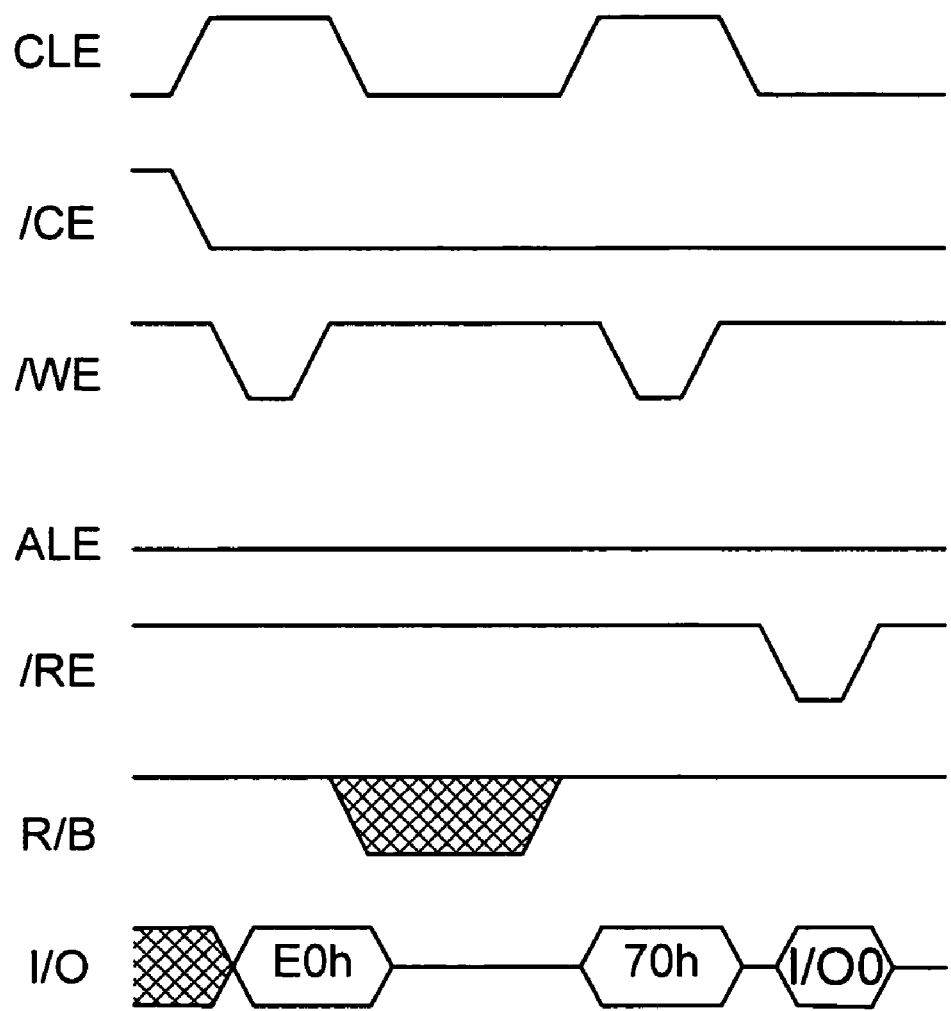

FIG. 2C shows the timing waveforms for the same commands for a random write operation, which is the writing of a single logical block to the disk drive. FIG. 2D shows timing waveforms for the sequential write operation, which is the writing of multiple logical blocks in one operation. Note that the R/B signal is used to indicate the buffer status for flow control over the interface. FIG. 2E shows the timing waveforms for a non-data command, for instance, Standby Immediate, Flush Cache EXT, etc.

The disk drive controller 100 of FIG. 1A includes data buffering supported by SRAM or DRAM buffer 118, memory controller 116, and buffer manager 112. Buffering is useful here because typically the host controller and the disk drive may not read/write at the same data rates. Because the data transfer is open-ended in terms of length, a read look-ahead is typically implemented in disk drive firmware to ensure continuous data flow and maximum interface throughput. For a fast host, which reads or writes data faster than the disk drive reads or writes data respectively, the host transfer rate is faster than the disk data rate. Hence maximum interface throughput may be achieved for a read operation and buffer usage is typically small. This is illustrated graphically in FIG. 3A where block 302 indicates the spin-up of the disk drive, the loading of the disk drive read head, the seeking of the disk drive head, and the reading of data. The R/B signal at this point is de-asserted (level 0), indicating to the host that data is not ready. In block 304, as soon as one single sector is read from the disk and is available in the buffer, the R/B signal is asserted (level 1), indicating to the host that data is ready for transfer. In block 306, the buffer is empty after the host finishes one sector read. The buffer may continue to be empty until a new sector is read from the disk and the R/B signal is de-asserted during this period. In block 308, a new sector is read and again the R/B signal is asserted. The conditions in blocks 306 and 308 may repeat until all sectors requested by the host are read from the disk. In block 310, the disk returns to its standby/spin-down mode and is no longer active.

FIG. 3B shows the associated buffer handling of a read operation for a "slow host." A slow host means that the host system transfer data rate is slower than that of the disk data rate. In this case, a read look-ahead method is employed in order to buffer the data as much as the buffer memory capacity 118 permits. To maximize power saving, the SOC (System-on-Chip) and preamplifier of the disk drive can be put in an idle mode until the data in buffer 118 buffer has been completely consumed. With reference to the FIG. 3B, in block 312, the disk drive is in its spin-up, load, seek and read mode with the R/B command de-asserted as in FIG. 3A. The next block 314 is similar to that of block 304 in FIG. 3A. The block 316 results in an idle state, wherein sectors are being transferred from the buffer to the host while the drive is in idle mode. At this point the R/B signal is asserted. Missing revolution may happen at this time due to buffer-full status. In block 318, N-n sectors of data remain in the buffer to be transferred to the disk drive and the disk drive is still in the idle state until all data in the buffer have been consumed. At this point the R/B signal is still being asserted. In block 320, the disk drive returns to its standby/spin-down mode.

Figure 3C:
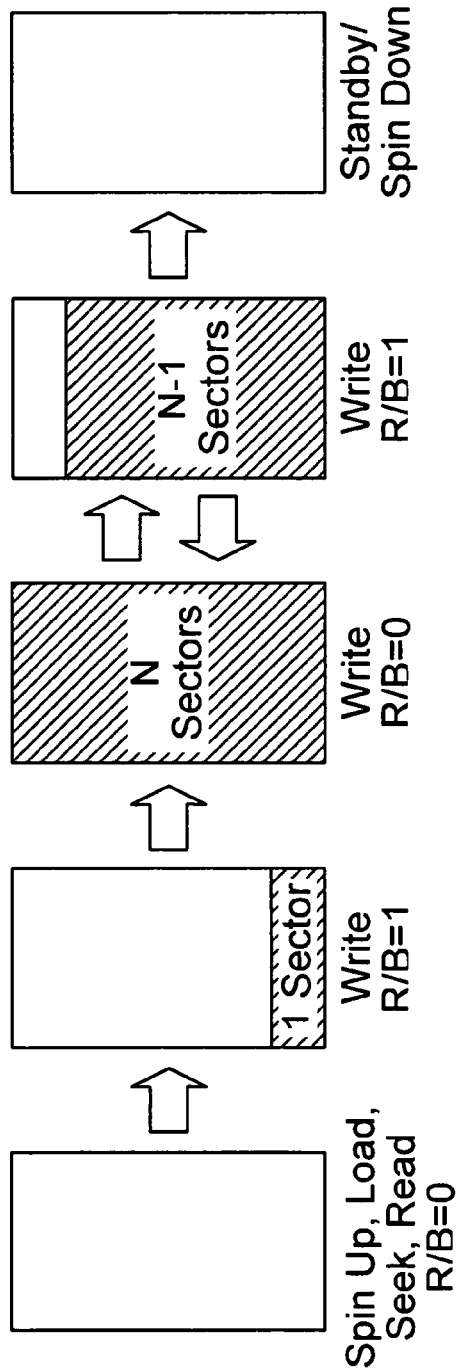
FIGS. 3C and 3D show further buffering of the interface of FIG. 1A for a write operation.

FIG. 3C shows the buffer handling for a write operation with a fast host. A fast host means the host is operating faster than the disk drive in terms of data transfer. In this case, maximum efficiency is obtained without the disk drive missing any revolutions, that is it is operating at all times in terms of transferring data. In this case the host system, being the faster of the two entities, is throttled down (reduced in terms of data transfer rate) by the R/B signal when the buffer 118 in the interface is full. Other blocks shown in FIG. 3C are self-explanatory with reference to FIGS. 3A and 3B.

Figure 3D:
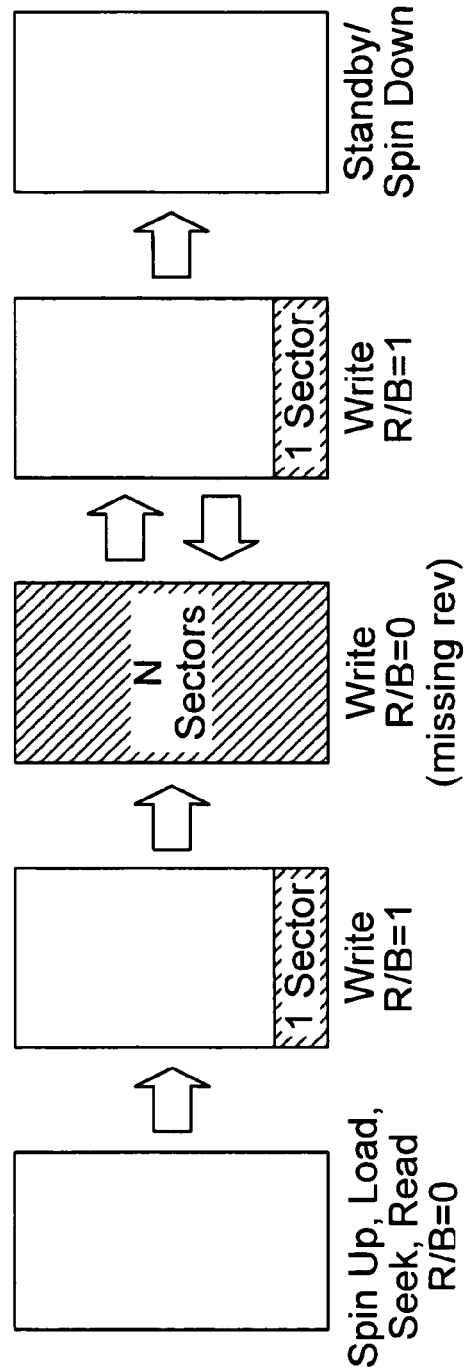

FIG. 3D shows the buffer handling for a write operation for a slow host where missing disk drive revolutions will occur. In this case the write performance degradation is caused by the slowness of the host relative to the data transfer rate of the disk drive regardless of what interface is used. The blocks in FIG. 3D are self-explanatory with reference to the previous figures.

FIG. 4A shows a set of internal commands for one embodiment of the disclosed interface controller. As shown in this case, there are five commands in the leftmost column. The value of the command in the first cycle and the second cycle are shown in the next two columns. The rightmost column in FIG. 4A shows what these commands refer to in terms of read and write operations. The values in the first cycle and the second cycle refer to the command code used by the host and correspond to the values in the timing waveforms. Note that some commands are only one cycle long and some other commands are two cycles long. These commands are latched in by the interface controller 110 of FIG. 1A, and are interpreted by firmware running on the processor 130. The commands used by the host are not limited to this list shown in FIG. 4A. Since these commands may be emulated from traditional ATA commands, any ATA command may be constructed in the similar manner but with a different command code. The interface controller 130 not only provides connectivity between a host and a disk drive via a NAND flash memory interface, it also provides means to pass ATA commands from the host to the disk drive.

These commands map to task file registers used in the ATA commands for the ATA industry standard disk drive specification. In the case of the disclosed interface controller, the sector count used in the ATA task file registers is not present or needed. The Logical Block Address (LBA) Low command in ATA maps to, in the present case, LBA0.

The ATA LBA Mid command maps to, in this case, LBA1. The ATA LBA High command maps to LBA2. The LBA Low Ext command maps to LBA3. The Command Register in ATA maps to the first cycle command code (e.g., 25h). The ATA Status Register maps to I/O 0 that is returned by the device immediately following the second cycle command code of 70h.

Note that in one embodiment of the present invention, the logical block address is 32 bits long, which allows addressing of up to 2 terabytes of storage capacity in the disk drive. In addition, the command structure consumes less of the system bandwidth than in the ATA interfaces, and there is no performance degradation if the host is faster in terms of data transfer rate than the disk drive.

Figure 5:
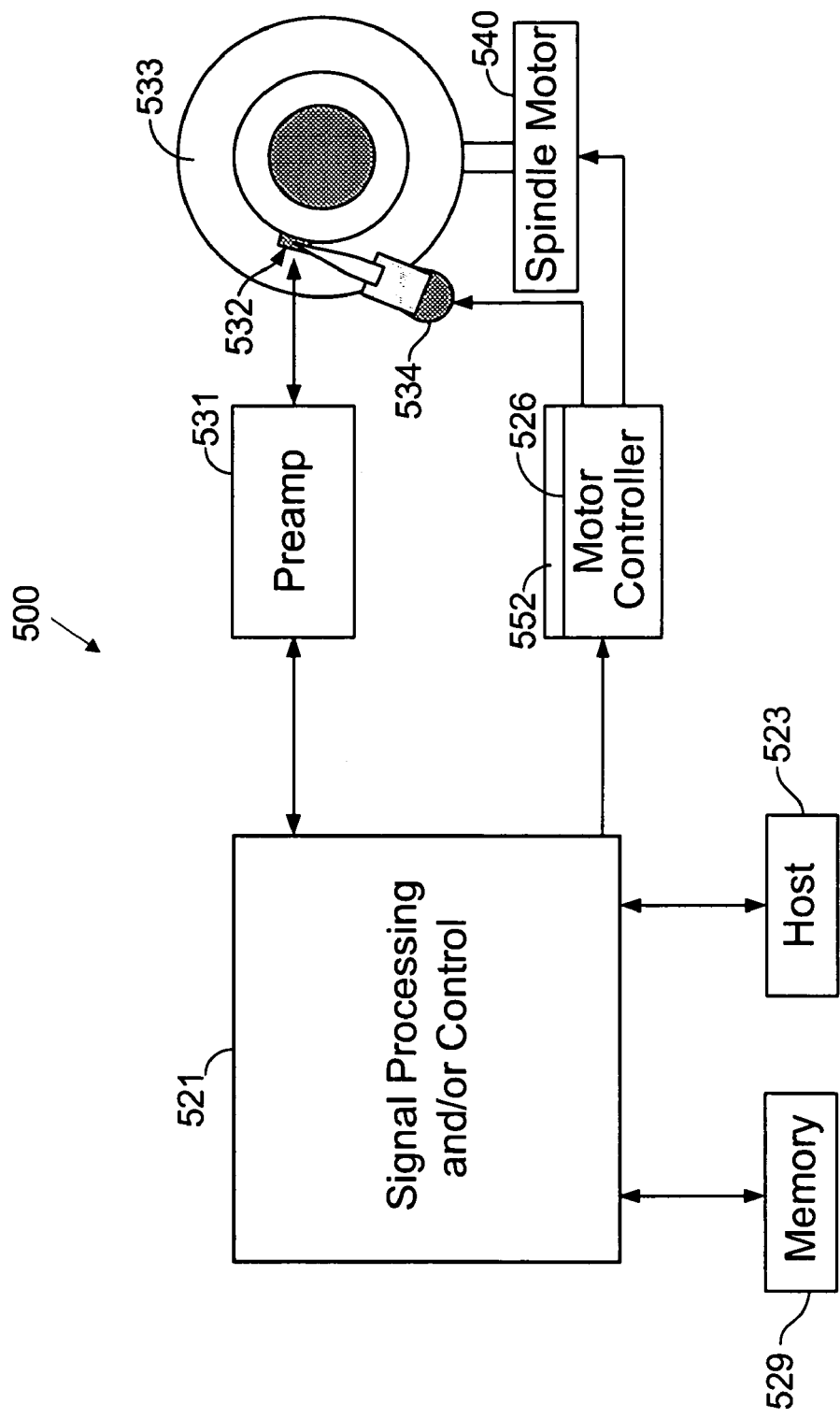
FIG. 5 is an illustrative block diagram of a hard disk drive (HDD) system that includes the disclosed interface controller circuitry in accordance with an embodiment of the invention.

FIG. 5 is an illustrative block diagram of a hard disk drive (HDD) system 500 that includes the disclosed interface controller circuitry in accordance with an embodiment of the invention. The disclosed interface controller circuitry (not shown) may be included in either or both signal processing and/or control circuitry 521. FIG. 1B illustrates example of uses of the disclosed interface controller circuitry applicable to the control circuitry 521. In some implementations, the signal processing and/or control circuitry 521 and/or other circuits (not shown) in the disk drive may process data, perform coding and/or encryption, perform calculations, and/or format data that is output to and/or received from a (magnetic) storage medium 533.

The disk drive may communicate with a host device 523 such as a computer, mobile computing devices such as personal digital assistants, cellular phones, media or MP3 players and the like, and/or other devices via one or more wired or wireless communication links. The disk drive may be connected to memory 529 such as random access memory (RAM), low latency nonvolatile memory such as flash memory, read only memory (ROM) and/or other suitable electronic data storage. Moreover, the signal processing and/or control circuits 521 may be implemented as a system-on-chip (SOC), and the memory 529 may be disposed on or off such SOC. The disk drive 500 may comprise a motor controller 526 that controls a spindle motor 540 and an actuator arm controller 552 that controls movement of an actuator arm 534. The actuator arm 534 may include a read/write (R/W) head 532 that writes/reads data to/from the storage medium 533. A preamp 531 may output write data to the R/W head 532. The preamp 531 may also output data read by the R/W head 532 to the signal processing and/or control circuitry 521.

Figure 6:
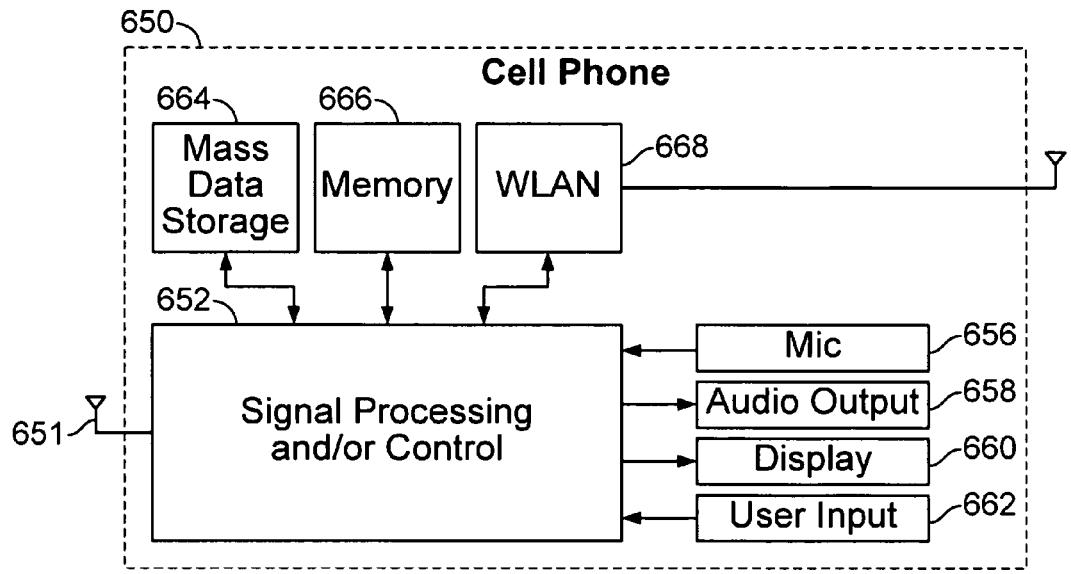
FIG. 6 is an illustrative block diagram of a cellular phone system that includes the disclosed interface controller circuitry in accordance with an embodiment of the invention.

FIG. 6 is an illustrative block diagram of a cellular phone system 650 that includes the disclosed interface controller circuitry in accordance with an embodiment of the invention. The cellular phone 650 includes a cellular antenna 651. Signal processing and/or control circuits 652 communicate with a WLAN interface and/or memory 666 or mass data storage 664 of the cellular phone 650. In some implementations, the cellular phone 650 includes a microphone 656, an audio output 658 such as a speaker and/or audio output jack, a display 660 and/or an input device 662 such as a keypad, pointing device, voice actuation and/or other input device. The mass data storage 664 includes the disclosed interface controller circuitry (not shown). FIG. 1B illustrates example of uses of the disclosed interface controller circuitry applicable to the control of mass data storage 664.

More particularly, the cellular phone 650 may communicate with mass data storage 664 that stores data in a nonvolatile manner such as optical and/or magnetic storage devices for example hard disk drives (HDD) and/or DVDs. At least one HDD may have the configuration shown in FIG. 5 and/or at least one DVD player may have the general configuration shown in FIG. 8. The HDD may be a mini HDD that includes one or more platters having a diameter that is smaller than approximately 1.8 inches. The cellular phone 650 may be connected to memory 666 such as RAM, ROM, low latency nonvolatile memory such as flash memory and/or other suitable electronic data storage. The cellular phone 650 also may support connections with a WLAN via a WLAN network interface 668.

Figure 7:
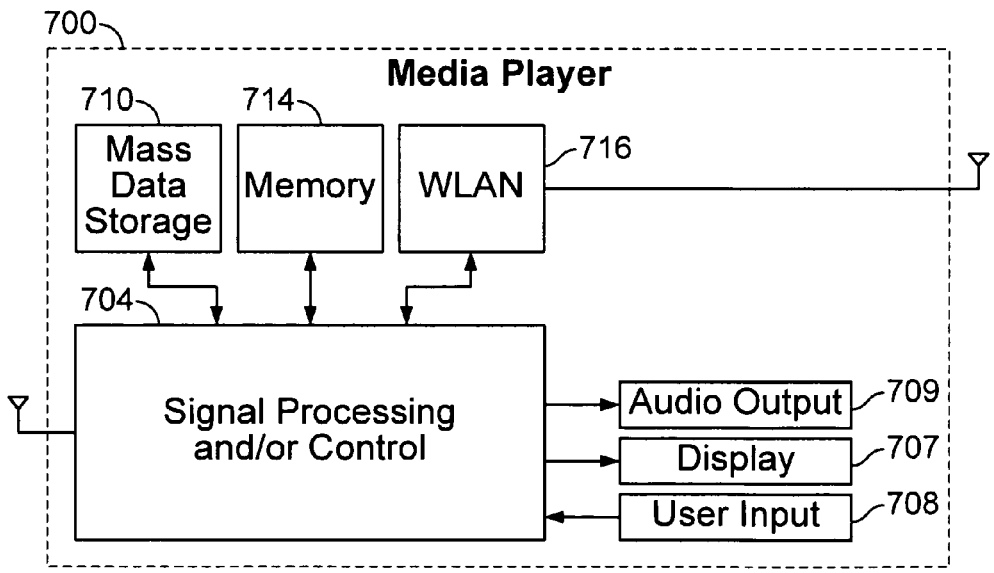
FIG. 7 is an illustrative block diagram of a media player that includes the disclosed interface controller circuitry in accordance with an embodiment of the invention.

FIG. 7 is an illustrative block diagram of a media player 700 that includes the disclosed interface controller circuitry in accordance with an embodiment of the invention. In one embodiment the media player may comprise an MP3 player, for example. The media player 700 may communicate with mass data storage 710 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 5 and/or at least one DVD may have the general configuration shown in FIG. 8. The HDD may be a mini HDD that includes one or more platters having a diameter that is smaller than approximately 1.8 inches. The media player 700 may be connected to memory 714 such as RAM, ROM, low latency nonvolatile memory such as flash memory and/or other suitable electronic data storage. The media player 700 also may support connections with a WLAN via a WLAN network interface 716. Still other implementations in addition to those described above are contemplated.

Signal processing and/or control circuits 704 communicate with a WLAN interface 716 and/or mass data storage 710 and/or memory 714 of the media player 700. The mass data storage 710 includes the disclosed interface controller circuitry (not shown). FIG. 1B illustrates example of uses of the disclosed interface controller circuitry applicable to the mass data storage 710. In some implementations, the media player 700 includes a display 707 and/or a user input 708 such as a keypad, touchpad and the like. In some implementations, the media player 700 may employ a graphical user interface (GUI) that typically employs menus, drop down menus, icons and/or a point-and-click interface via the display 707 and/or user input 708. The media player 700 further includes an audio output 709 such as a speaker and/or audio output jack. The signal processing and/or control circuits 704 and/or other circuits (not shown) of the media player 700 may process data, perform coding and/or encryption, perform calculations, format data and/or perform any other media player function.

Figure 8:
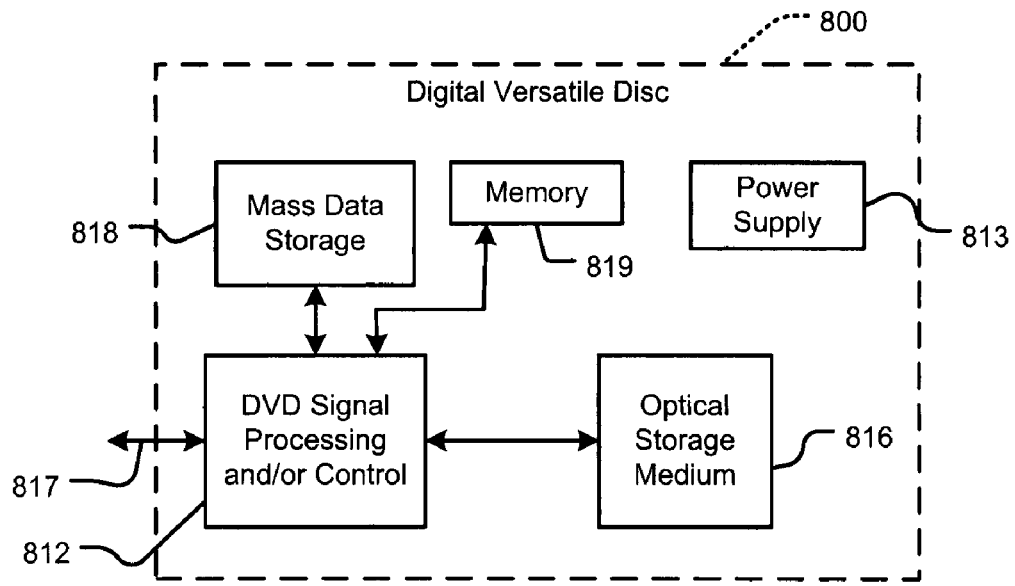
FIG. 8 is an illustrative block diagram of a digital versatile disk (DVD) drive that includes the disclosed interface controller circuitry in accordance with an embodiment of the invention.

FIG. 8 is an illustrative block diagram of a digital versatile disk (DVD) drive 800 that includes the disclosed interface controller circuitry in accordance with an embodiment of the invention. The disclosed interface controller circuitry may be implemented in either or both signal processing and/or control circuits, 812, mass data storage 818 and/or a power supply 813. The signal processing and/or control circuit 812 and/or other circuits (not shown) in the DVD 800 may process data, perform coding and/or encryption, perform calculations, and/or format data that is read from and/or data written to an optical storage medium 816. In some implementations, the signal processing and/or control circuit 812 and/or other circuits (not shown) in the DVD 800 can also perform other functions such as encoding and/or decoding and/or any other signal processing functions associated with a DVD drive.

The DVD drive 800 may communicate with an output device (not shown) such as a computer, television or other device via one or more wired or wireless communication links 817. The DVD 800 may communicate with mass data storage 818 that stores data in a nonvolatile manner. The mass data storage 818 may include a hard disk drive (HDD). The HDD may have the configuration shown in FIG. 5. The HDD may be a mini HDD that includes one or more platters having a diameter that is smaller than approximately 1.8 inches. The DVD 800 may be connected to memory 819 such as RAM, ROM, low latency nonvolatile memory such as flash memory and/or other suitable electronic data storage.

Figure 9:
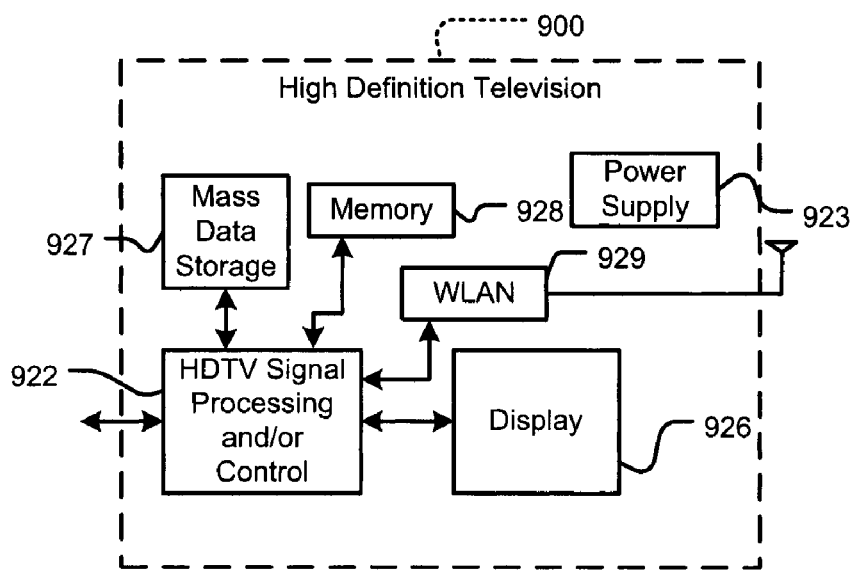
FIG. 9 is an illustrative block diagram of a high definition television (HDTB) that includes the disclosed interface controller circuitry in accordance with an embodiment of the invention.

FIG. 9 is an illustrative block diagram of a high definition television (HDTV) 900 that includes the disclosed interface controller circuitry in accordance with an embodiment of the invention. The disclosed interface controller circuitry may be implemented in either or both signal processing and/or control circuits, 922, a WLAN interface 929, mass data storage 927 and/or a power supply 923. The HDTV 900 receives HDTV input signals in either a wired or wireless format and generates HDTV output signals for a display 926. In some implementations, signal processing circuit and/or control circuit 900 and/or other circuits (not shown) of the HDTV 900 may process data, perform coding and/or encryption, perform calculations, format data and/or perform any other type of HDTV processing that may be required.

The HDTV 900 may communicate with mass data storage 927 that stores data in a nonvolatile manner such as optical and/or magnetic storage devices. At least one HDD may have the configuration shown in FIG. 5 and/or at least one DVD may have the configuration shown in FIG. 8. The HDD may be a mini HDD that includes one or more platters having a diameter that is smaller than approximately 1.8 inches. The HDTV 900 may be connected to memory 928 such as RAM, ROM, low latency nonvolatile memory such as flash memory and/or other suitable electronic data storage. The HDTV 900 also may support connections with a WLAN via a WLAN network interface 929.

Figure 10:
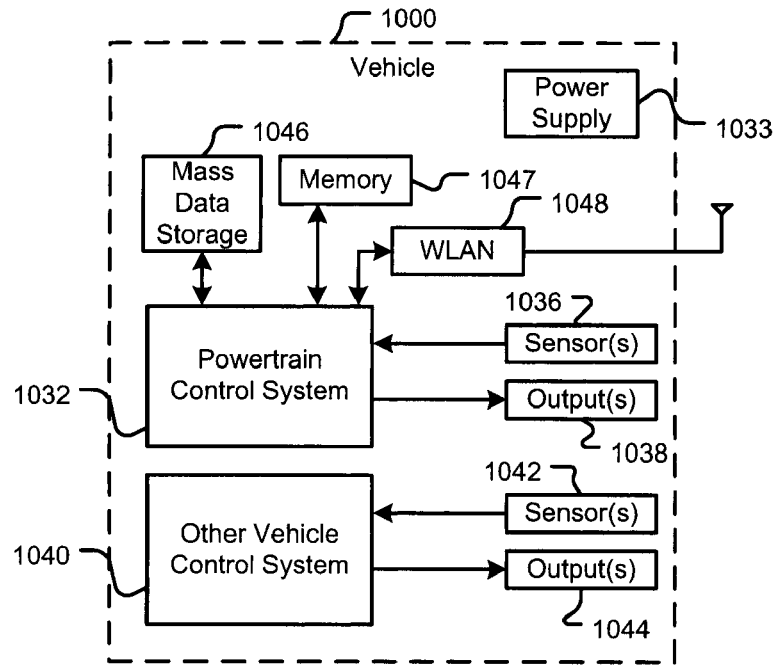
FIG. 10 is an illustrative block diagram of vehicle control systems that includes the disclosed interface controller circuitry in accordance with an embodiment of the invention.

FIG. 10 is an illustrative block diagram of a vehicle 1000 including control systems that include the disclosed interface controller circuitry in accordance with an embodiment of the invention. In some implementations a powertrain control system 1032 receives power from a power supply 1033, inputs from one or more sensors 1036 such as temperature sensors, pressure sensors, rotational sensors, airflow sensors, and/or any other suitable sensors and/or that generates one or more output control signals 1038 such as engine operating parameters, transmission operating parameters, and/or other control signals.

Other control systems 1040 of the vehicle 1000 may likewise receive signals from input sensors 1042 and/or output control signals to one or more output devices 1044. In some implementations, the control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1032 may communicate with mass data storage 1046 that stores data in a nonvolatile manner. The mass data storage 1046 may include optical and/or magnetic storage devices for example hard disk drives HDD and/or DVDs. At least one HDD may have the configuration shown in FIG. 5 and/or at least one DVD may have the configuration shown in FIG. 8. The HDD may be a mini HDD that includes one or more platters having a diameter that is smaller than approximately 1.8 inches. The powertrain control system 1032 may be connected to memory 1047 such as RAM, ROM, low latency nonvolatile memory such as flash memory and/or other suitable electronic data storage. The powertrain control system 1032 also may support connections with a WLAN via a WLAN network interface 1048. The control system 1040 may also include mass data storage, memory and/or a WLAN interface (all not shown).

Figure 11:
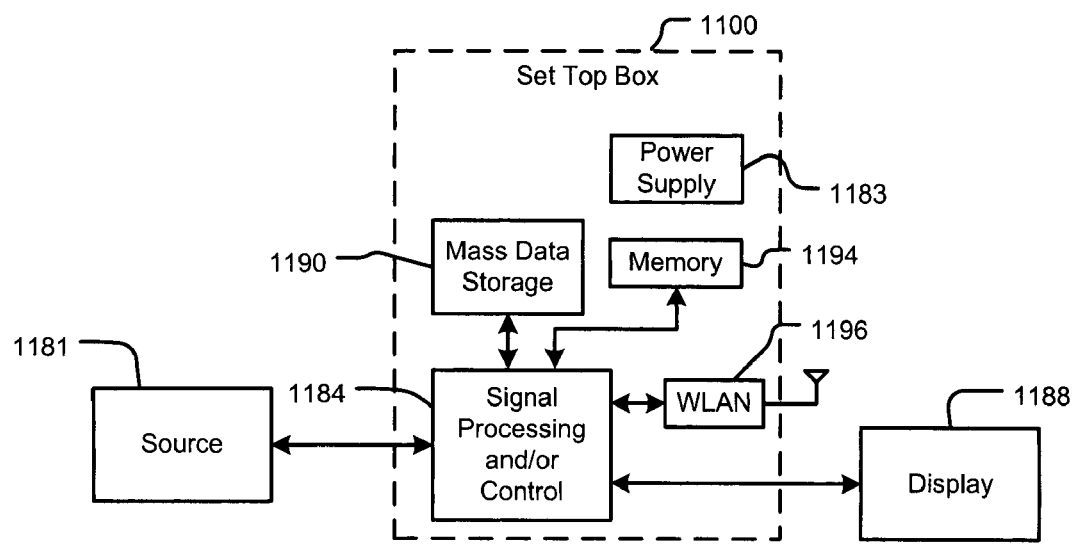
FIG. 11 is an illustrative block diagram of a set top box that includes the disclosed interface controller circuitry in accordance with an embodiment of the invention.

FIG. 11 is an illustrative block diagram of a set top box 1100 that includes the disclosed interface controller circuitry in accordance with an embodiment of the invention. The disclosed interface controller circuitry may be implemented in either or both signal processing and/or control circuits 1184, a WLAN interface 1196, mass data storage 1190 and/or a power supply 1183. The set top box 1100 receives signals from a source 1181 such as a broadband source and outputs standard and/or high definition audio/video signals suitable for a display 1188 such as a television and/or monitor and/or other video and/or audio output devices. The signal processing and/or control circuits 1184 and/or other circuits (not shown) of the set top box 1100 may process data, perform coding and/or encryption, perform calculations, format data and/or perform any other set top box function.

The set top box 1100 may communicate with mass data storage 1190 that stores data in a nonvolatile manner. The mass data storage 1190 may include optical and/or magnetic storage devices for example hard disk drives HDD and/or DVDs. At least one HDD may have the configuration shown in FIG. 5 and/or at least one DVD may have the configuration shown in FIG. 8. The HDD may be a mini HDD that includes one or more platters having a diameter that is smaller than approximately 1.8 inches. The set top box 1100 may be connected to memory 1194 such as RAM, ROM, low latency nonvolatile memory such as flash memory and/or other suitable electronic data storage. The set top box 1100 also may support connections with a WLAN via a WLAN network interface 1196.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as are suited to the particular use contemplated.

The invention claimed is:

1. A method for coupling a disk drive to a host via a disk controller, the method comprising:
    coupling the disk controller to the host using a NAND flash memory interface having a 14-line bus;
    interpreting commands received from the host via the NAND flash memory interface using a flash controller;
    emulating data transfer protocols of the disk drive using the flash controller;
    storing data received from the host and from the disk drive in a buffer memory;
    controlling the buffer memory via a buffer manager interface according to data transfer rates of the host and the disk drive;
    coupling a register memory to the flash controller;
    coupling the register memory to a processor of the disk controller via a processor bus;
    storing commands programmed by the processor and the host in the register memory; and
    synchronizing control signals between the flash controller and the buffer manager interface.

2. The method of claim 1, wherein emulating data transfer protocols comprises:
    controlling the NAND flash memory interface for implementing a random read of the disk drive by the host; and
    controlling the NAND flash memory interface for implementing a random write of the disk drive by the host.

3. The method of claim 1, wherein emulating data transfer protocols further comprises:
    controlling the NAND flash memory interface for implementing a sequential read of the disk drive by the host; and
    controlling the NAND flash memory interface for implementing a sequential write of the disk drive by the host.

4. The method of claim 1, wherein emulating data transfer protocols further comprises:
    controlling the NAND flash memory interface for implementing a transfer of commands between the host and the disk drive.

5. The method of claim 4 further comprising:
    mapping a set of disk drive commands to a corresponding set of flash memory commands.

6. The method of claim 5, wherein the set of disk drive commands comprises:
    Read DMA EXT;
    Write DMA EXT;
    Standby Immediate;
    Flush Cache EXT; and
    Reset.

7. The method of claim 1 further comprising:
    coupling the flash controller to the processor bus through the register memory; and
    coupling the flash controller to a buffer manager of the disk drive through a memory wrapper, wherein the memory wrapper transfers data to and from the buffer manager in a first-in-first-out manner.

8. The method of claim 1, wherein controlling the buffer memory comprises:
    storing read data from the disk drive in the buffer memory to compensate for differences in data transfer rates between the host and the disk drive; and
    sending a data ready signal to the host to indicate there is data in the buffer memory.

9. The method of claim 1, wherein controlling the buffer memory further comprises:
    storing write data from the host in the buffer memory to compensate for differences in data transfer rates between the host and the disk drive; and
    sending a data ready signal to the host to indicate there is space in the buffer memory.

10. A disk controller for coupling a disk drive to a host, the disk controller comprising:
    an interface controller to interface the disk drive to the host using a NAND flash memory interface having a 14-line bus; and
    a buffer memory to store data received from the host and from the disk drive;
    wherein the interface controller comprises:
        a flash controller to interpret commands received from the host via the NAND flash memory interface and to emulate data transfer protocols of the disk drive;
        a memory wrapper in communication with the flash controller, wherein the memory wrapper controls the buffer memory via a buffer manager interface according to data transfer rates of the host and the disk drive;
        a register memory in communication with the flash controller and in communication with a processor of the disk controller via a processor bus, wherein the register memory stores commands programmed by the processor and the host; and a synchronizing module that synchronizes control signals between the flash controller and the buffer manager interface.

11. The disk controller of claim 10, wherein the flash controller:
controls the NAND flash memory interface to implement a random read of the disk drive; and
controls the NAND flash memory interface to implement a random write of the disk drive.

12. The disk controller of claim 10, wherein the flash controller:
controls the NAND flash memory interface to implement a sequential read of the disk drive; and
controls the NAND flash memory interface to implement a sequential write of the disk drive.

13. The disk controller of claim 10, wherein the flash controller:
controls the NAND flash memory interface to implement a transfer of commands between the host and the disk drive.

14. The disk controller of claim 13, wherein the flash controller:
maps a set of disk drive commands to a corresponding set of flash memory commands.

15. The disk controller of claim 14, wherein the set of disk drive commands comprises:
Read DMA EXT;
Write DMA EXT;
Standby Immediate;
Flush Cache EXT; and
Reset.

16. The disk controller of claim 10, wherein the flash controller:
stores read data from the disk drive in the buffer memory to compensate for differences in data transfer rates between the host and the disk drive; and
sends a data ready signal to the host to indicate there is data in the buffer memory.

17. The disk controller of claim 10, wherein the flash controller:
stores write data from the host in the buffer memory to compensate for differences in data transfer rates between the host and the disk drive; and
sends a data ready signal to the host to indicate there is space in the buffer memory.

18. The disk controller of claim 10, wherein the processor is implemented by an embedded processor or by an external microprocessor.

19. The disk controller of claim 10, wherein the 14-line bus is a 14-line parallel bus that includes 8 bidirectional input/output (I/O) data lines and 6 control lines, and wherein the 6 control lines consist of command latch enable (CLE), address latch enable (ALE), chip enable (CE), read enable (RE), write enable (WE), and ready/busy (R/B).

20. The disk controller of claim 10, wherein the disk drive is embedded in at least one of a portable computer and a consumer electronics device comprising the host.

21. A system for coupling a disk drive to a host via a disk controller, the system comprising:
first interfacing means for interfacing the disk drive to the host using a NAND flash memory interface having a 14-line bus; and
first storing means for storing data received from the host and from the disk drive;
wherein the first interfacing means comprises:
emulating means for interpreting commands received from the host via the NAND flash memory interface and for emulating data transfer protocols of the disk drive;
first controlling means for controlling the first storing means via second interfacing means for interfacing a buffer manager according to data transfer rates of the host and the disk drive;
second storing means for storing commands programmed by a processor of the disk controller and the host, wherein the second storing means is in communication with the emulating means and is in communication with the processor via a processor bus; and
synchronizing means for synchronizing control signals between the emulating means and the second interfacing means.

22. The system of claim 21, wherein the emulating means comprise:
second controlling means for controlling the NAND flash memory interface to implement a random read of the disk drive; and
third controlling means for controlling the NAND flash memory interface to implement a random write of the disk drive.

23. The system of claim 21, wherein the emulating means comprise:
second controlling means for controlling the NAND flash memory interface to implement a sequential read of the disk drive; and
third controlling means for controlling the NAND flash memory interface to implement a sequential write of the disk drive.

24. The system of claim 21, wherein the emulating means comprise:
second controlling means for controlling the NAND flash memory interface to implement a transfer of commands between the host and the disk drive.

25. The system of claim 24 further comprising:
mapping means for mapping a set of disk drive commands to a corresponding set of flash memory commands.

26. The system of claim 21 further comprising:
first coupling means for coupling the emulating means to the processor bus through the second storing means; and
second coupling means for coupling to the buffer manager of the disk drive through a memory wrapper, wherein the memory wrapper transfers data to and from the buffer manager in a first-in-first-out manner.

27. The system of claim 21, wherein the first controlling means comprise:
third storing means for storing read data from the disk drive in the first storing means to compensate for differences in data transfer rates between the host and the disk drive; and
sending means for sending a data ready signal to the host to indicate there is data in the first storing means.

28. The system of claim 21, wherein the first controlling means comprise:
third storing means for storing write data from the host in the first storing means to compensate for differences in data transfer rates between the host and the disk drive; and
sending means for sending a data ready signal to the host to indicate there is space in the first storing means.

29. A disk controller for interfacing a disk drive to a host, the disk controller comprising:
- a flash register that
  - communicates with a processor of the disk controller via an advanced high-speed bus (AHB) of the disk controller, and
  - stores control commands programmed by the processor and the host;
- a flash controller that
  - communicates with the host using a 14-line bus of a NAND flash memory interface,
  - emulates data transfer protocols of the disk drive,
  - decodes flash commands received from the host via the NAND flash memory interface using a flash state machine, and
  - generates control signals for the disk controller to control the disk drive;
- a FIFO wrapper that controls data transfers to and from a buffer manager of the disk controller via a buffer manager interface according to data transfer rates of the host and the disk drive in response to the flash commands, wherein a direction of the data transfers is controlled by the control commands stored in the flash register; and
- a synchronization module that synchronizes timing signals between the flash controller and the buffer manager interface.

30. The disk controller of claim 29 further comprising a defect management module that:
- communicates with the processor via the AHB,
- communicates with the buffer manager, and
- performs track format generation and defect management of the disk drive based on the flash commands.

31. The disk controller of claim 29, wherein the disk controller is implemented in an integrated circuit (IC).

* * * * *